June 11, 1929.  E. G. ANDERSON  1,717,298
SIGNAL
Filed Oct. 22, 1928
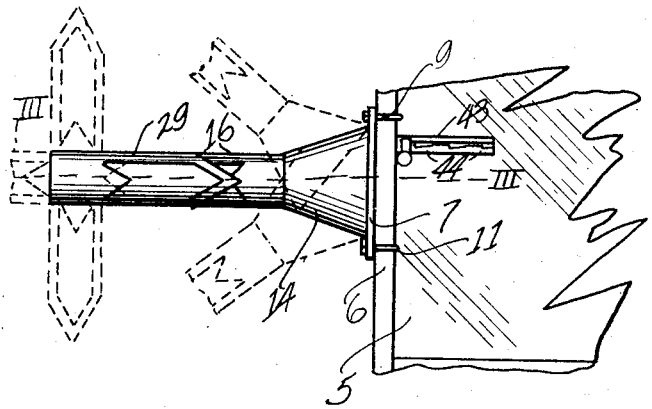
Fig. I.
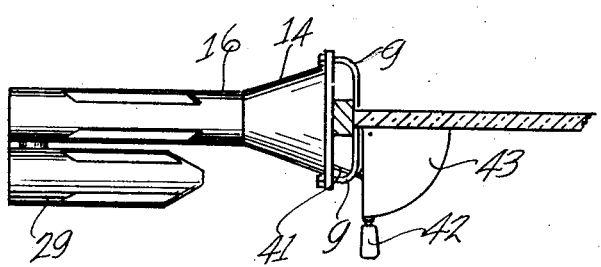
Fig. II.
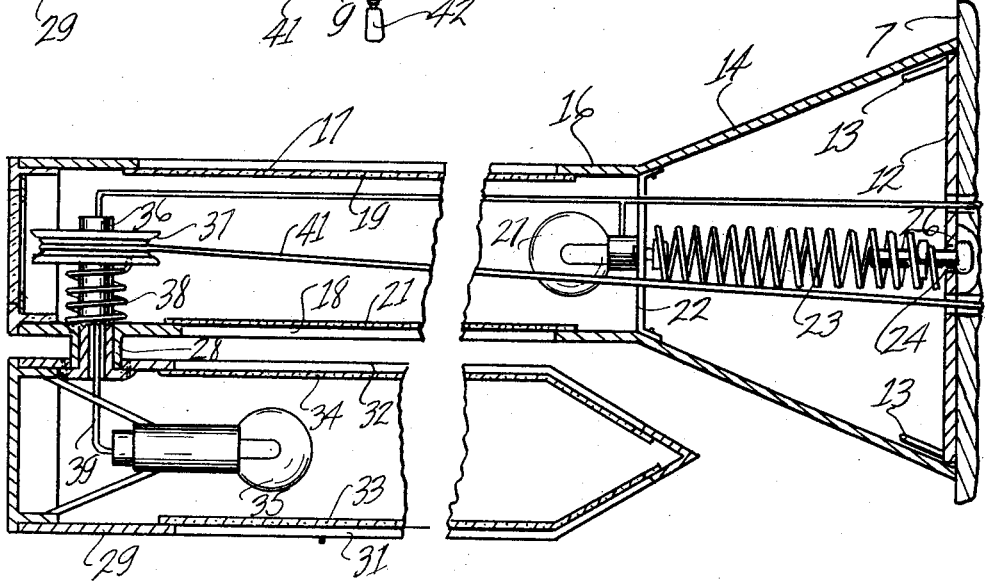
Fig. III.
INVENTOR:
Eric G. Anderson
BY Victor J. Evans
ATTORNEYS.

Patented June 11, 1929.

1,717,298

UNITED STATES PATENT OFFICE.

ERIC G. ANDERSON, OF KINGSBURG, CALIFORNIA.

SIGNAL.

Application filed October 22, 1928. Serial No. 314,143.

This invention relates to improvements in signals and has particular reference to a signal adapted to be attached to an automobile.

The principal object is to provide a signal which may be struck by a passing obstruction without damaging the signal.

Another object is to produce a device which will indicate all of the standard forms of direction indicators that is now required by law.

A further object is to produce a device which is simple in construction and therefore economical to manufacture.

Other objects and advantages will be apparent during the course of the following description.

In the accompanying drawings forming a part of this specification and in which like numerals are employed to designate like parts throughout the same, Figure 1 is a fragmentary view of an automobile windshield having my signal attached thereto, Figure 2 is a top plan view of Figure 1, and Figure 3 is an enlarged detail section taken on the line 3—3 of Figure 1.

In the accompanying drawings wherein for the purpose of illustration is shown a preferred embodiment of my invention, the numeral 5 designates a windshield having a frame 6 to which the base plate 7 of my device is attached. This base plate may be secured in any convenient manner as by clamps 9 and 11. The base plate 7 carries a supplemental plate 12 having pins 13 positioned at the four corners thereof; the purpose of these pins will be later seen.

At 14 I have shown a comb shaped portion to which a tubular element 16 is attached. This tubular element is provided with windows 17 and 18 which are covered by a transparent material as shown at 19 and 21 respectively. A cross brace is shown at 22 to which a spring 23 has one end secured thereto and has its opposite end secured to a bolt 24 having a head 26, which head is engaged by the supplemental plate 12. A bulb 27 serves to illuminate the windows 17 and 18. Positioned adjacent the outer extremity of the tubular element 16 is a tubular hub 28, which hub serves to rotatably position a tubular pointer 29. This pointer is provided with windows 31 and 32 which in turn are closed by a transparent material as shown at 33 and 34. A bulb 35 serves to illuminate the interior of the pointer.

In order to rotate the pointer a shaft 36 is provided with a pulley 37 which is rigidly secured thereto. The opposite end of the shaft is secured to the pointer in any convenient manner. A spring 38 has one end secured to the tubular element 16 and has its opposite end secured to the pulley 37. The shaft 36 is hollow and it admits a cable 39 passing therethrough which cable carries an electric current to the bulb 35 and also to the bulb 27. It is of course understood that the opposite sides of these bulbs are grounded in the customary manner.

In order to rotate the shaft 36 I provide a cable 41 one end of which is connected to the pulley 37 and the opposite end is connected to a lever 42, pivotally mounted within a segmental housing 43. This housing has notches 44 formed in the edge thereof so that when the handle 42 is moved in the housing a change may be maintained in either one of several positions.

The result of this construction is that when the device is in operation, by moving the handle 42 pull is exerted on the cable 41 and consequently the pulley 37 is rotated a distance depending upon the amount of movement of the handle 42 with the result that the pointer 29 will be moved through the rotation of the shaft 36. When using the device at night, the bulbs 25 and 27 may be illuminated in the usual manner. Should the signal be struck by a passing object the signal will move away from the object as indicated in dotted lines of Figure 1. This is permitted through the fact that the signal is held to the base 7 only through the medium of the spring 23. The pins 13 serve to prevent the signal from moving out of its normal position while in use or during the period it is returning from its dotted line position of Figure 1 to its full line position.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. In a signal of the character described, a base, a supplemental plate secured to said base, a signal arm comprising a cone shaped portion, a tubular portion secured thereto, a movable pointer secured to said tubular portion, means for rotating said pointer, a spring having one end secured to said supplemental plate and having its opposite end secured within said signal arm.

2. In a signal of the character described, a base, a supplemental plate secured to said base, a spring secured to said supplemental plate, pins secured to said plate at a point adjacent its margin, a cone shaped member adapted to surround said supplemental plate and to rest on said base, a tubular member secured to said cone, means for securing the opposite end of said spring to said tubular member and a rotatable pointer carried by said tubular member for the purpose specified.

In testimony whereof I affix my signature.

ERIC G. ANDERSON.